Oct. 9, 1951     J. A. RAJCHMAN     2,570,858
FREQUENCY ANALYZER
Filed Feb. 26, 1949
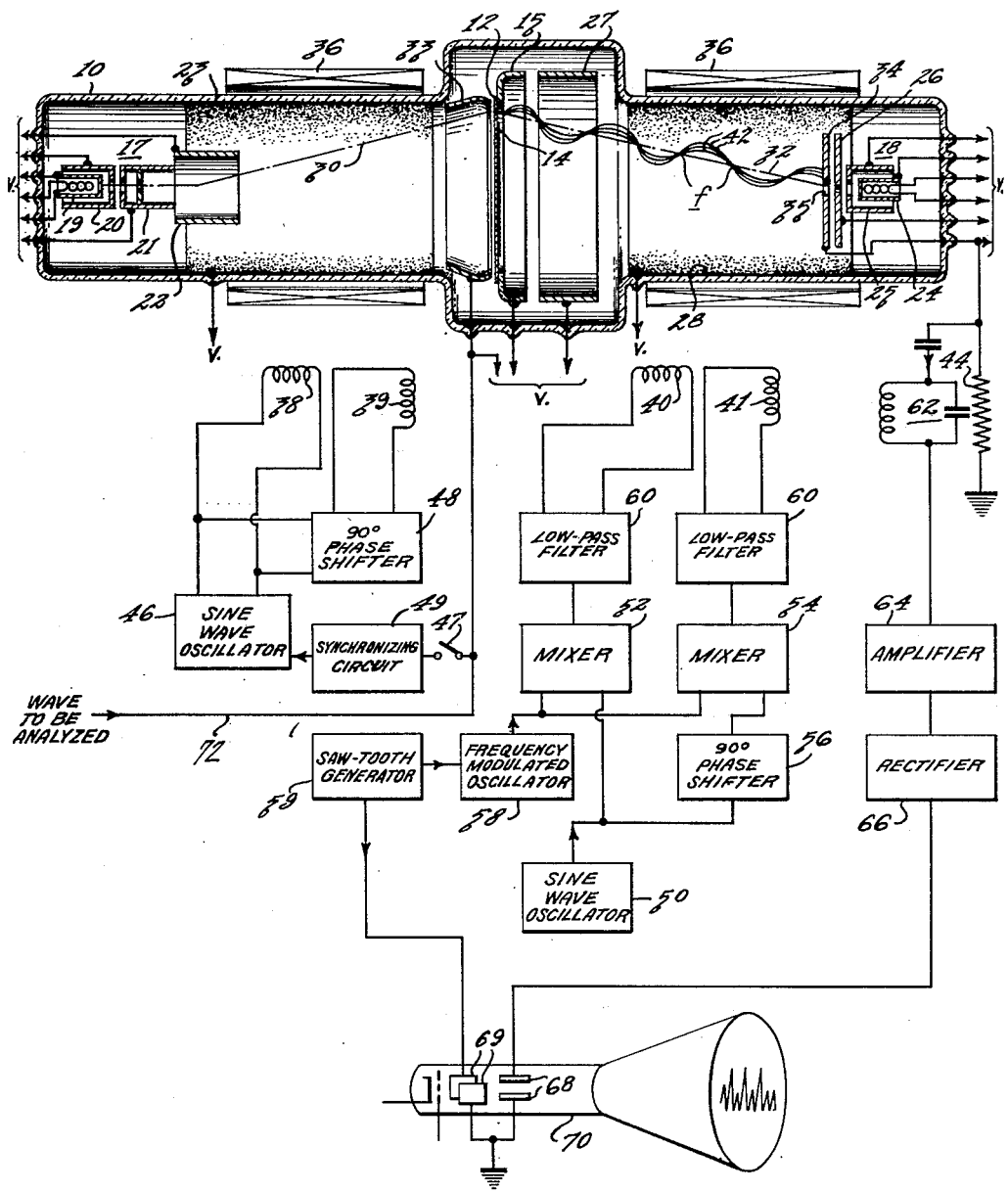
INVENTOR
*Jan A. Rajchman*
BY
ATTORNEY Patented Oct. 9, 1951

2,570,858

UNITED STATES PATENT OFFICE 2,570,858

FREQUENCY ANALYZER

Jan A. Rajchman, Princeton, N. J., assignor to Radio Corporation of America, a corporation of Delaware Application February 26, 1949, Serial No. 78,652

15 Claims. (Cl. 175—183)

This invention relates to improvements in frequency analyzers, and more particularly to improved apparatus for determining the frequency components of a complex electrical wave.

It is well known that complex electrical waves, such as amplitude and/or frequency modulated waves, can be treated, both mathematically and electrically, as a combination of individual components each having different magnitudes and frequencies. While mathematical analysis of such waves is helpful in designing circuits which will pass a predetermined waveshape, it is often necessary to analyze an unknown or unpredictable waveshape as it occurs, as in the case of monitoring systems and the like, and in such cases the mathematical approach cannot be used. Two possible electrical solutions of the problem are (1) "parallel searching," i. e. a search for all frequencies of interest by means of a plurality of channels each responsive to a different frequency (see e. g. U. S. Patent No. 2,159,790—Freystedt et al.), and (2) "seriatim searching," i. e. a successive search for each frequency of interest, one at a time (see e. g. U. S. Patent No. 2,403,986—Lacy). Parallel searching is impractical where fine resolution is required because of the large number of separate channels involved, while prior art systems for seriatim searching generally include bulky mechanical apparatus with moving parts, and are limited in applicability to frequencies in the audio spectrum. The present invention is directed to frequency analysis by seriatim searching, and has as its principal object the provision of improved apparatus for analyzing high or low frequency complex waves in a simple and efficient manner.

Another object of the invention is to provide frequency analyzing apparatus having no moving parts.

A further object of the invention is to provide improved apparatus for substantially simultaneous and instantaneous identification of all components of a complex wave.

According to the invention, the foregoing and other objects and advantages are attained by utilizing a cathode ray storage tube, which, for the purpose of this specification and the appended claims, is taken to mean a cathode ray tube wherein an electrical wave can be impressed on a storage element, such as a dielectric target, by means of one electron beam, and wherein the "stored" wave can be regenerated or reproduced by means of a second electron beam. The complex wave to be analyzed is recorded on the storage element at a relatively low scanning rate, while analysis of the recorded wave is accomplished by scanning the storage element at a much higher rate. The components of the output wave from the storage tube can be separately identified, either by varying the rate of wave reproduction and passing the reproduced waves through a fixed-frequency resonant detecting circuit, or by reproducing the stored wave at a fixed rate while varying the resonant frequency of the detecting circuit.

A more complete understanding of the invention may be had by reference to the following description of an illustrative embodiment thereof, when considered in connection with the accompanying drawing, the single figure of which illustrates, partly in cross-section, partly in perspective, and partly in block diagram form, apparatus for frequency analysis in accordance with the invention.

The apparatus shown in the drawing includes a plural beam cathode ray storage tube 10, having a storage element 12 placed at right angles to the axis of the tube 10 intermediate the ends thereof. The storage element 12 may consist of a relatively thin disc of dielectric material, such as glass, mica, or the like, and has a plate or coating of conductive material 14 mounted on, or contiguous to, one surface thereof. The storage element 12 is mounted on a supporting ring 15 of conductive material, and the ring 15 is connected to a source of voltage V (not shown) through a lead brought out through the envelope of the tube 10.

The tube 10 also contains a pair of electron guns 17, 18 for projecting beams of electrons towards the storage element 12. The gun 17 comprises a cathode 19, control grid 20, first anode 21, second anode 22, and a stabilizing electrode 23 consisting of a conductive coating on the inner surface of the tube envelope. The gun 18 comprises a cathode 24, a control grid 25, an accelerating anode 26, a focussing electrode 27, and a stabilizing electrode 28 consisting of a conductive coating on the inner surface of the tube envelope. The electron beam 30 from the gun 17 is utilized for recording waves on the storage element 12, in a manner to be described hereinafter, and is referred to herein as the "recording beam," while the electron beam 32 from the gun 18 is utilized to "read" (i. e. reproduce) waves recorded on the storage element 12, and is referred to herein as the "reading beam."

The tube 10 is also provided with a collector electrode 33 which consists of a metallic element in the general shape of a truncated cone located adjacent the storage element 12 between the storage element 12 and the recording gun 17. Another collector electrode 34 is also provided in the tube 10, and comprises a disc of conductive material placed adjacent the reading gun 18. The collector 34 has a circular opening 35 in the center thereof, through which electrons may pass in traveling between the cathode 24 of the gun 18 and the storage element 12. The collector electrode 34 is utilized in reproducing recorded waves in the tube 10 in a manner to be described hereinafter.

The storage tube 10 has a magnetic beam-focussing and beam-deflecting system, including a pair of focussing coils 36 for establishing a magnetic field running parallel to the axis of the tube 10, and two pairs of deflection coils, 38, 39, and 40, 41 for establishing "horizontal" and "vertical" deflecting fields for the beams 30 and 32, respectively. It will be understood that the horizontal and vertical deflecting fields for the beams 30, 32 are both arranged perpendicular to the axis of the tube 10 in actual practice, although the drawing has been simplified by showing the coils 38–41 schematically.

All of the electrodes 19–28, 33, 34 of the tube 10 are connected to a voltage source V (not shown). Typical operating voltages for the tube 10 are given in the following table:

*Table*

|  | Volts |  | Volts |
|---|---|---|---|
| Ring 15 | (−) 4 | Cathode 24 | 0 |
| Cathode 19 | (−) 300 | Grid 25 | (−) 20 |
| Grid 20 | (−) 320 | Anode 26 | 300 |
| Anode 21 | (−) 100 | Electrode 28 | 300 |
| Anode 22 | 0 | Collector 33 | (−) 3 |
| Electrode 23 | 0 | Collector 34 | 295 |

With the voltages set forth in the table applied to the electrodes of the tube 10, the electrons in the recording beam 30 will travel at a relatively high velocity, and will strike the storage element 12 with sufficient energy to cause secondary emission therefrom in a ratio of secondary-to-primary electrons greater than one. If an A. C. voltage wave having a peak magnitude of say, 2 volts, is applied to the collector electrode 33, it will have a negligible effect on the recording beam 30, but the number of secondary electrons from the storage element 12 which will be attracted to the collector 33 will depend on the instantaneous voltage on the collector 33. If the recording beam 30 is caused to scan the storage element 12 along a circular path, a pattern of electrical charges will be left on the element 12 along the path of the beam 30, with the point-to-point configuration of this pattern being dependent on the rate of scanning for the beam 30 and on the frequency and magnitude of the voltage wave applied to the collector electrode 33. Of course, the charge pattern left after any one scan of the recording beam 30 will be rearranged during the next succeeding scan of the beam 30.

As is well known, if sinusoidal currents, in phase quadrature, are passed through the deflecting coils 38, 39, the recording beam 30 will scan the storage element 12 along a circular path, at a scanning rate which will be dependent on the frequency of the currents in the deflecting coils 38, 39. The magnitude of the currents in the deflecting coils 38, 39 can be adjusted readily so that the recording beam 30 will follow a circular path of diameter slightly less than the inner diameter of the collector 33 adjacent the storage element 12.

As was previously mentioned, the storage element 12 comprises a thin sheet of dielectric material, and is preferably sufficiently thin to permit charge leakage therethrough, so that the charge pattern on both surfaces of the element 12 will be substantially identical. However, there will be little or no leakage along the surface of the element 12. Due to the presence of the metallic ring 15, any differences between the voltage on the ring 15 and the voltage on the element 12 (along the circular scanning path of the recording beam 30) will set up radially directed electric fields on the surface of the element 12 at the points of voltage difference. Consequently, if the charge pattern on the surface of the storage element 12 is of varying intensity from point-to-point along the path followed by the recording beam 30, as will be the case when a varying voltage is applied to the collector electrode 33, the radial fields on the surface of the element 12 will also be of varying intensity.

The action of the reading beam 32 is somewhat different than that of the recording beam 30. The deflection coils 40, 41 are supplied with quadrature phase-related sinusoidal currents equal in magnitude to the currents flowing in the deflection coils 38, 39 so that the two beams will scan coextensive portions of the storage element 12, on opposite surfaces thereof. However, with operating voltages of the order of those specified in the table, the electric field distribution within the tube 10 will cause the electrons in the beam 32 to travel from the cathode 24 toward the element 12 at a relatively low velocity, so that these electrons will not strike the storage element 12, although they will come sufficiently close to the storage element 12 to be influenced by any radially directed fields on the surface thereof.

In the absence of any radial fields on the storage element 12, the electrons in the beam 32 will return to the cathode 24 along the same path which they followed in moving away from the cathode 24, and will pass through the aperture 35 in the collector electrode 34. On the other hand, if the electrons in the beam 32 approach the storage element 12 at a point where a radial field exists between the ring 15 and the path followed by the recording beam 30, the electrons in the beam 32 will be deflected slightly, and will acquire transverse components of velocity which will cause the electrons so deflected to follow spiral paths 42 in moving back toward the cathode 24.

As is well known, electrons traveling in a uniform magnetic field from a common point of origin, and having unequal components of velocity in a direction transverse to the magnetic field, will follow different spiral paths which converge at common focal points. As is shown in cross section in the drawing, each of the spiral paths 42 followed by deflected electrons traveling away from the element 12 crosses the main beam-path 32 at common focal points f. If the collector electrode 34 is placed at an antinodal point on the spiral paths 42 of the deflected electrons, as shown, electrons moving toward the cathode 24 along the paths 42 will be intercepted by the collector 34 and will cause a voltage to appear across a resistor 44 connected to the collector 34. The voltage developed across the resistor 44 will be an alternating voltage, and will have a frequency which will be related to the frequency of waves applied to the collector 33 in the ratio of the reading beam scanning rate to the recording beam scanning rate, while the instantaneous magnitude of the voltage appearing across the resistor 44 will be proportional to the instantaneous magnitude of the waves applied to the collector electrode 33. As will be explained, a complex wave can be analyzed by recording the wave on the storage element 12 at a low scanning frequency, and causing the reading beam 32 to scan the element 12 at a much higher frequency while carrying on a seriatim search for the frequencies of interest in the reproduced wave.

In the apparatus shown in the drawing, the deflection currents for the recording beam 30 are obtained from a sine wave oscillator 46, the output of which is applied directly to one of the recording beam deflection coils 38, while the other deflection coil 39 for the beam 30 is supplied with current through a 90 degree phase shift circuit 48. If the incoming waves to be analyzed are of a periodic nature, the frequency of the oscillator 46 can be synchronized with the fundamental frequency of the incoming waves in a manner well known in the art by utilizing small portions of the incoming waves as keying impulses for the oscillator 46. A switch 47 and synchronizing circuit 49 are provided for this purpose, as shown.

The deflection system for the reading beam 32 is adapted to provide quadrature phase related currents, of varying frequency, to the deflection coils 40, 41. The reading beam deflection system includes a sine wave oscillator 50 coupled directly to a mixer circuit 52, and also coupled to a second mixer circuit 54 through a 90 degree phase-shift circuit 56. A frequency-modulated sine wave oscillator 58, such as a reactance tube oscillator, is also coupled to each of the mixer circuits 52, 54, and the mixer circuits 52, 54 are coupled through filter circuits 60 to the deflection coils 40, 41. The frequency of the oscillator 58 is controlled by a sawtooth wave oscillator 59, such as a multivibrator or relaxation oscillator, so that the frequency of the waves from the oscillator 58 will increase gradually during each cycle of the sawtooth waves from the oscillator 59, and will drop back to a predetermined minimum frequency at the end of each sawtooth-wave cycle. The mixer circuits 52, 54 will combine the waves from the fixed frequency oscillator 50 and the varying frequency oscillator 58, so that the waves at the outputs of the mixer circuits 52, 54 will contain components corresponding in frequency to the waves from the oscillator 50, to the waves from the oscillator 58, and to the sum and difference of the frequencies of the waves from the oscillators 50, 58.

The filter circuits 60 are adjusted to suppress waves of all frequencies except those corresponding to the difference between the fixed frequency of the oscillator 50 and the varying frequency of the oscillator 58. Hence, the deflection currents flowing through the coils 40, 41 will be quadrature phase-related currents, varying in frequency between predetermined limits at a rate determined by the frequency of the sawtooth generator 59. Since all of the circuits 46—60 are well known per se, it is deemed unnecessary to describe them in any greater detail.

The individual components of the voltage waves appearing across the output resistor 44 of the storage tube 10 may be identified by means of a frequency sensitive utilization network, including a resonant circuit 62 coupled through an amplifier 64 and a rectifier or detector 66 to one of the sets of electro-static deflection plates 68 of a cathode ray tube indicator 70. The other set of deflecting plates 69 of the tube 70 is supplied with a sawtooth scanning voltage from the sawtooth oscillator 59, so that the beam in the indicator tube 70 will be deflected horizontally once during each complete cycle of frequency variation of the currents flowing the deflection coils 40, 41 of the tube 10.

In order to explain the operation of the apparatus shown in the drawing, it will be assumed that a complex wave, applied to an input lead 72 for the apparatus, is to be analyzed to detect the presence of all components thereof having frequencies between 500 kilocycles and 5 megacycles. Let it also be assumed that the oscillator 46 is operating at a frequency of 100 cycles per second, that the oscillator 50 is operating at a frequency of 5 megacycles, that the frequency of the oscillator 58 is variable between 4.90 and 4.99 megacycles, that the sawtooth generator 59 is operating at a frequency of 1 kilocycle, and that the circuit 62 has a resonant frequency of 500 megacycles. Under these conditions, the recording beam scanning rate will be 100 cycles per second, while the reading beam scanning rate will vary between 10 and 100 kilocycles per second at a rate of 1 kilocycle per second.

The complex wave being analyzed will be recorded and reproduced in the tube 10 in the manner previously described, and the frequency of each component of the original wave will be multiplied in the reproduced wave by a factor equal to the ratio between reading beam scanning rate and recording beam scanning rate at any given instant. Since the reading beam scanning rate varies between 10 and 100 kilocycles, while the recording beam scanning rate is fixed at 100 cycles, the frequency of each component of the original wave will be multipled between 100 and 1000 times, with the exact amount of multiplication depending on the instantaneous reading beam scanning rate. For example, during a portion of one given scan of the reading beam, all components of the recorded wave will be reproduced as components having 100 times their original frequencies, while during a portion of the next succeeding scan of the reading beam, all components of the recorded wave will be reproduced as components having 200 times their original frequencies. More specifically, during a portion of one given scan of the reading beam, all 5 megacycle components of the recorded wave will appear as 500 megacycle components of the reproduced wave. During a portion of the next succeeding scan of the reading beam, all 2.5 megacycle components of the recorded wave will appear as 500 megacycle components of the reproduced wave, while the 5 megacycle components of the recorded wave will appear as 1000 megacycle components of the reproduced wave. This simply means that by varying the rate of scanning for the reading beam 32 between 10 kilocycles and 100 kilocycles, any component of the wave being analyzed which has a frequency between 500 kilocycles and 5 megacycles will be regenerated as a wave having a frequency lying within a band of frequencies which includes 500 megacycles. Thus, by varying the rate of scanning for the reading beam 32, a result is attained which is equivalent to using a constant scanning rate for the reading beam 32 while varying the resonant frequency of the circuit 62.

All components of the original wave which are regenerated as 500 m. c. waves will pass through the resonant circuit 62, the amplifier 64, and the detector 66, and will cause a vertical deflection of the beam in the indicator tube 70. Since the horizontal deflection of the beam in the indicator tube 70 is controlled by the sawtooth waves from the oscillator 59, and since the instantaneous frequency of the waves from the oscillator 58 is also controlled by the sawtooth waves from the oscillator 59, it is clear that the horizontal position of the beam in the tube 70 will have a predetermined relation to the scanning frequency for the reading beam 32 in the tube 10, so that the horizontal deflection axis of the tube 70 can be calibrated in terms of the frequency of each wave-component causing a vertical deflection of the beam in the tube 70. Also, the magnitude of the reproduced waves applied to the vertical deflection plates 68 of the tube 70 will be proportional to the magnitude of the corresponding individual component of the wave being analyzed, so that the display on the screen of the tube 70 will indicate both the frequency and the relative magnitude of each component of interest in the wave being analyzed.

If desired, the analysis pattern presented on the screen of the cathode ray tube 70 can be recorded on film with standard photographic equipment (not shown).

Since many changes could be made in the apparatus shown and described, all within the scope and spirit of the invention, the foregoing is to be construed as illustrative, and not in a limiting sense.

What is claimed is:

1. Apparatus for analyzing complex electrical waves containing components of different frequency, said apparatus comprising a cathode ray storage tube including an electrical-wave-storage element and a pair of electron beam generating means for directing electron beams toward said storage element, means operatively associated with said storage element and including one of said beam generating means for recording said electrical waves on said storage element, said last-named means being adapted to be connected to a source of complex waves to be analyzed, said recording means also including means to repeatedly deflect an electron beam generated by said one beam generating means along a predetermined path on said storage element and at a predetermined rate, means operatively associated with said storage element and including the other of said beam generating means for reproducing said recorded waves, said reproducing means also including means to repeatedly deflect an electron beam generated by said other beam generating means along a path on said storage element coextensive with said predetermined path and at a rate higher than said predetermined rate, a frequency-sensitive utilization network coupled to said reproducing means to select a single component frequency from the reproduced waves, and means to vary the frequency relation between said single component frequency and the frequency components in said recorded waves.

2. Apparatus as defined in claim 1 wherein said storage element comprises a dielectric target, and wherein said pair of beam generating means includes electron guns disposed on opposite sides of said target.

3. Apparatus as defined in claim 1, wherein said utilization network includes a resonant circuit and a cathode ray tube indicator coupled to said resonant circuit.

4. Apparatus for analyzing complex electrical waves containing components of different frequencies, said apparatus comprising a cathode ray storage tube including (1) a dielectric target element adapted to receive and retain charge-patterns comprising distributed electrical charges of different magnitude, and (2) electron guns for projecting beams of electrons towards said element, charge-pattern producing means operatively associated with said element and including one of said guns for producing on said element at a predetermined rate electrical charge-patterns having a predetermined relation to said waves, said charge pattern producing means including an electrode adapted to be connected to a source of complex waves to be analyzed, means operatively associated with said element and including another of said guns for scanning with an electron beam said charge patterns on said element at a variable rate higher than said predetermined rate to reproduce electrical waves of higher frequency than said complex waves from said charge-patterns, and a fixed frequency frequency-sensitive utilization network coupled to said last-mentioned means.

5. Apparatus as defined in claim 4, including means for deflecting said beams in substantially coextensive scanning paths relative to said target element, said beam from said one gun being deflected at a lower angular frequency than said beam from said another gun.

6. Apparatus as defined in claim 4 wherein said electron guns are located on opposite sides of said target element.

7. Apparatus as defined in claim 4 wherein said charge-pattern producing means includes a collecting electrode for secondary electrons from said target element, said collecting electrode being located adjacent said target element between said target element and said one electron gun.

8. Apparatus as defined in claim 4, wherein said wave reproducing means includes a collecting electrode located in said storage tube adjacent said another electron gun in a position to intercept electrons moving from said target element toward said another electron gun after being deflected due to the influence of said charge pattern.

9. Apparatus as defined in claim 4 wherein said utilization network includes a resonant circuit responsive to waves of a single predetermined frequency.

10. Apparatus as defined in claim 4, wherein said utilization network includes a resonant circuit and a cathode ray tube indicator coupled to said resonant circuit.

11. Apparatus for analyzing complex electrical waves containing components of different frequencies, said apparatus comprising a cathode ray storage tube including (1) a dielectric target element, (2) a first electron gun for bombarding one surface of said target with a first beam of electrons, (3) a collector electrode located adjacent said target for collecting secondary electrons emitted from said target, said collector electrode being adapted to be connected to a source of complex waves to be analyzed, (4) a second electron gun for directing a second beam of electrons toward said target, said second gun having a cathode maintained at a positive potential with respect to the potential of said target, and (5) a second collecting electrode for picking up electrons originating in said second beam and reflected from said target toward said cathode, first beam deflecting means for deflecting said first beam along a circular scanning path relative to said element at a predetermined scanning rate, second beam deflecting means for deflecting said second beam along a path substantially coextensive with said circular path at a variable rate higher than said predetermined rate, and a fixed frequency-sensitive-utilization network coupled to said second collecting electrode.

12. Apparatus as defined in claim 11 wherein said second beam deflecting means includes (1) a pair of deflecting coils, (2) a source of fixed frequency sinusoidal waves, (3) a source of variable frequency sinusoidal waves, (4) a source of sawtooth waves coupled to said variable frequency wave source to control the frequency of the waves from said variable frequency source, (5) wave mixing circuits coupled to said fixed and said variable frequency wave sources, and (6) a 90° phase shifting circuit coupled between said fixed frequency wave source and one of said mixing circuits, each of said wave mixing circuits being coupled to one of said deflecting coils.

13. Apparatus as defined in claim 12 wherein said utilization network comprises (1) a resonant circuit, and (2) a cathode ray tube indicator having two sets of electrostatic deflection plates, one of said sets of deflection plates being coupled to said resonant circuit and the other of said sets of deflection plates being coupled to said sawtooth wave generator.

14. Apparatus as defined in claim 11 wherein said first beam deflecting means includes (1) a pair of first deflecting coils, and (2) a source of sinusoidal currents in phase quadrature coupled to said first coils, and wherein said second beam deflecting means includes (1) a pair of second deflecting coils, and (2) a source of variable frequency sinusoidal currents in phase quadrature coupled to said second deflecting coils.

15. Apparatus as defined in claim 11 wherein said utilization network comprises a resonant circuit and a cathode ray tube indicator coupled to said resonant circuit.

JAN A. RAJCHMAN.

REFERENCES CITED

The following references are of record in the file of this patent:

UNITED STATES PATENTS

| Number | Name | Date |
|--------|------|------|
| 2,403,986 | Lacy | July 16, 1946 |
| 2,403,997 | Potter | July 16, 1946 |